United States Patent
Sekimoto et al.

(10) Patent No.: US 10,365,629 B2
(45) Date of Patent: *Jul. 30, 2019

(54) NUMERICAL CONTROLLER AND MOVEMENT CONTROL METHOD FOR TOOL THAT MAXIMIZES SYNTHETIC MOVEMENT VELOCITY IN A CUTTING FEED BY ROTATING THE TABLE TO A SELECTED ANGLE

(71) Applicant: FANUC CORPORATION, Yamanashi (JP)

(72) Inventors: Kouji Sekimoto, Yamanashi-ken (JP); Kazuo Sato, Yamanashi-ken (JP); Hideaki Maeda, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 13 days.

This patent is subject to a terminal disclaimer.

(21) Appl. No.: 15/658,850

(22) Filed: Jul. 25, 2017

(65) Prior Publication Data

US 2018/0032051 A1    Feb. 1, 2018

(30) Foreign Application Priority Data

Jul. 28, 2016   (JP) ................................ 2016-147979

(51) Int. Cl.
    *G05B 19/19*       (2006.01)
    *G05B 19/416*      (2006.01)
                 (Continued)

(52) U.S. Cl.
    CPC ............. *G05B 19/19* (2013.01); *B23Q 15/26* (2013.01); *G05B 19/402* (2013.01);
                 (Continued)

(58) Field of Classification Search
    CPC ......... A23L 7/13; A23P 30/10; G05B 19/402; G05B 2219/49203; G05B 2219/45044;
                 (Continued)

(56) References Cited

U.S. PATENT DOCUMENTS 4,617,720 A * 10/1986 Palfery .................. B23Q 1/522
                                             409/221
2015/0105900 A1    4/2015 Maki
                 (Continued)

FOREIGN PATENT DOCUMENTS

CN            1675601 A      9/2005
CN         104380217 A      2/2015
                (Continued)

OTHER PUBLICATIONS

JP 2015055923 A, (Makino Milling Mach CO Ltd), Mar. 23, 2015, (Abstract). [online] [retrive on Mar. 23, 2015]. Retrieved from: ip.com.*

(Continued)

*Primary Examiner* — Thomas C Lee
*Assistant Examiner* — Anzuman Sharmin
(74) *Attorney, Agent, or Firm* — Fredrikson & Byron, P.A.

(57) ABSTRACT

A numerical controller includes: a program analyzing unit to obtain a first movement end point position of the tool; a direction calculating unit to calculate a synthetic movement direction that maximizes a synthetic velocity, based on an upper limit movement velocity of the tool in each of the two axis directions; an end point position calculating unit to calculate an intersection position of a circle and the synthetic movement direction as a second movement end point position, wherein the circle has as a radius a distance from a rotation center position of the table to the first movement end point position; a rotation angle calculating unit to calculate (Continued)

a rotation angle of the table based on the first movement end point position and the second movement end point position; and a rotation control unit to control rotation of the table based on the rotation angle.

12 Claims, 4 Drawing Sheets

(51) Int. Cl.
  *G05B 19/402* (2006.01)
  *B23Q 15/26* (2006.01)
  *G05B 19/408* (2006.01)
(52) U.S. Cl.
  CPC ...... *G05B 19/4163* (2013.01); *G05B 19/4083* (2013.01); *G05B 2219/35261* (2013.01); *G05B 2219/49078* (2013.01); *G05B 2219/50046* (2013.01); *G05B 2219/50336* (2013.01)
(58) Field of Classification Search
  CPC .......... G05B 19/19; G05B 2219/35261; G05B 2219/49078; G05B 2219/50336; B23Q 15/26
  USPC .......................................................... 700/187
  See application file for complete search history.

(56) References Cited

U.S. PATENT DOCUMENTS

| | | |
|---|---|---|
| 2016/0103446 A1 | 4/2016 | Aizawa et al. |
| 2018/0224828 A1* | 8/2018 | Pitz .................... G05B 19/4068 |

FOREIGN PATENT DOCUMENTS

| | | |
|---|---|---|
| JP | 05-119826 A | 5/1993 |
| JP | 2002-229617 A | 8/2002 |
| JP | 2002-304203 A | 10/2002 |
| JP | 2013164453 A * | 8/2013 |
| JP | 2013187571 A * | 9/2013 |
| JP | 201579286 A | 4/2015 |
| JP | 201681172 A | 5/2016 |

OTHER PUBLICATIONS

JP 2015035021 A, (Mitsubishi Electric Corp), Feb. 19, 2015, (Abstract). [Online] [ retrived on Feb. 19, 2015]. Retrieved from: ip.com.*
Salas et al., Calculus: One and Several Variables, 3rd ed., 1978, John Wiley & Sons, Inc., pp. 577-581.*
Smith, Trigonometry for College Students, Seocnd Edition 1980, Wadsworth, Inc., pp. 148-149.*
English Abstract for Japanese Publication No. 2015-079286 A, published Apr. 23, 2015, 1 pg.
English Abstract for Japanese Publication No. 2016-081172 A, published May 16, 2016, 2 pgs.
English Abstract and Machine Translation for Japanese Publication No. 2002-304203 A, published Oct. 18, 2002, 13 pages.
English Abstract and Machine Translation for Japanese Publication No. 2002-229617 A, published Aug. 16, 2002, 12 pages.
English Abstract and Machine Translation for Japanese Publication No. 05-119826 A, published May 18, 1993, 11 pages.
English Abstract and Machine Translation for Chinese Publication No. 1675601 A, published Sep. 28, 2005, 12 pgs.
English Abstract and Machine Translation for Chinese Publication No. 104380217 A, published Feb. 25, 2015, 20 pgs.

* cited by examiner

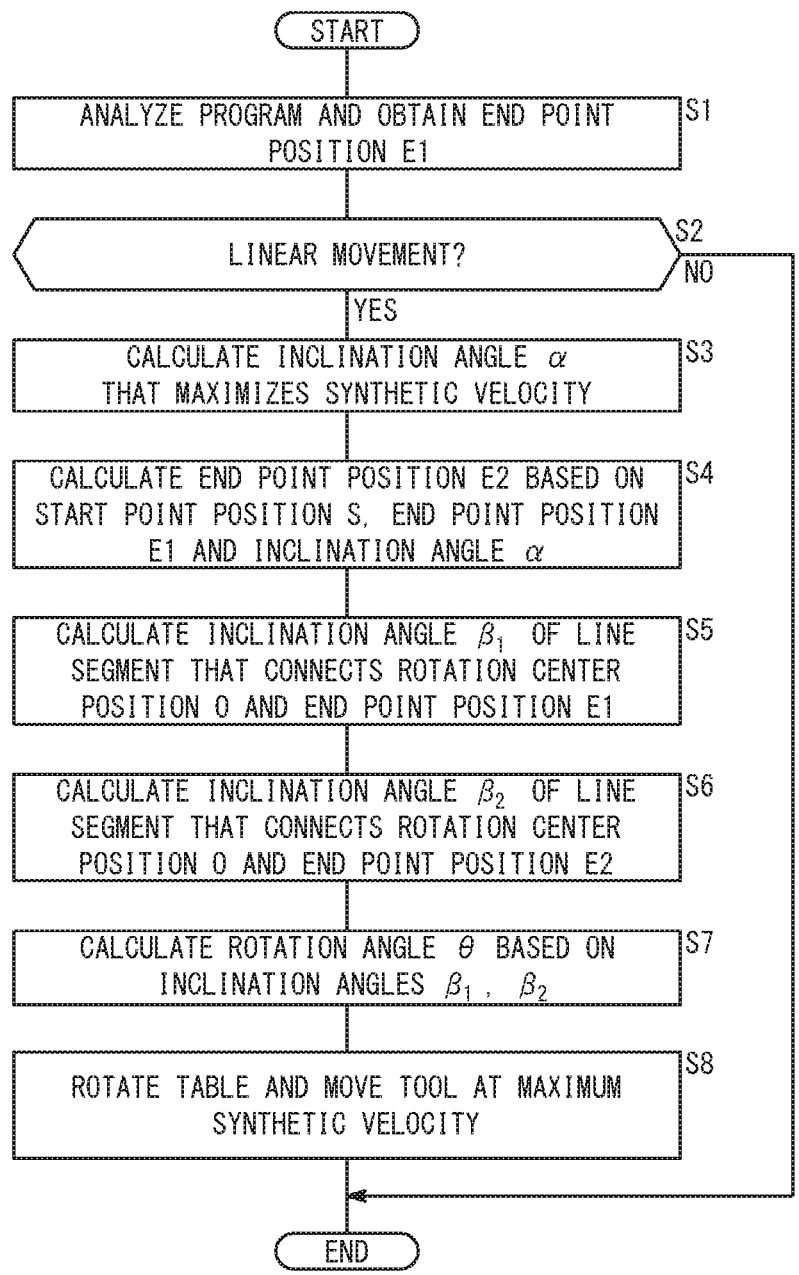

NUMERICAL CONTROLLER AND MOVEMENT CONTROL METHOD FOR TOOL THAT MAXIMIZES SYNTHETIC MOVEMENT VELOCITY IN A CUTTING FEED BY ROTATING THE TABLE TO A SELECTED ANGLE

CROSS-REFERENCE TO RELATED APPLICATION

This application is based upon and claims the benefit of priority from Japanese Patent Application No. 2016-147979 filed on Jul. 28, 2016, the contents of which are incorporated herein by reference.

BACKGROUND OF THE INVENTION

Field of the Invention

The present invention relates to a numerical controller and a movement control method for a tool that control axial feeding of the tool.

Description of the Related Art

As disclosed in Japanese Laid-Open Patent Publication No. 2015-079286, it is generally known that numerical controllers for controlling machine tools axially feed the movable shafts by controlling servo motors.

SUMMARY OF THE INVENTION

However, when the tool is axially fed by linearly moving the tool uniaxially, for example, it is only possible to axially feed the tool at a maximum movement velocity of this axis and it is not possible to reduce an axial feeding time any more.

It is therefore an object of the present invention to provide a numerical controller and a movement control method for a tool that reduce an axial feeding time.

A first aspect of the present invention is a numerical controller that moves a tool based on a program, wherein the tool is configured to machine a work supported on a table and is movable along at least two axis directions orthogonal to each other, and includes: a program analyzing unit configured to analyze the program to obtain a first movement end point position of the tool that is linearly moved; a direction calculating unit configured to calculate a synthetic movement direction that maximizes a synthetic velocity, based on a predetermined upper limit movement velocity of the tool in each of the at least two axis directions; an end point position calculating unit configured to calculate an intersection position of a circle and the synthetic movement direction as a second movement end point position, wherein the circle has as a radius a distance from a rotation center position of the table to the first movement end point position; a rotation angle calculating unit configured to calculate a rotation angle of the table based on the first movement end point position and the second movement end point position; and a rotation control unit configured to control rotation of the table about the rotation center position based on the rotation angle.

Thus, the synthetic velocity is used at maximum, so that it is possible to reduce an axial feeding time.

The first aspect of the present invention is the numerical controller, and the direction calculating unit may be configured to calculate an inclination angle of the synthetic movement direction; and the end point position calculating unit may be configured to calculate the second movement end point position based on a current position of the tool, the first movement end point position and the inclination angle of the synthetic movement direction. Consequently, it is possible to calculate the second movement end point position in the synthetic movement direction that maximizes the synthetic velocity, and move the tool along the synthetic movement direction that maximizes the synthetic velocity.

The first aspect of the present invention is the numerical controller, and the direction calculating unit may be configured to calculate the inclination angle $\alpha$ of the synthetic movement direction according to following equation (1) where Vx represents the upper limit movement velocity in one axis direction of the two axis directions and Vy represents the upper limit movement velocity in another axis direction; and the end point position calculating unit may be configured to calculate the second movement end point position according to simultaneous equations based on following equations (2), (3) where the known current position of the tool is $(X_s, Y_s)$, the first movement end point position is $(X_{e1}, Y_{e1})$ and the second movement end point position is $(X_{e2}, Y_{e2})$, $$\alpha = \tan^{-1} \frac{Vy}{Vx} \quad (1)$$

$$Y_{e2} = \alpha \cdot X_{e2} + Y_s - \alpha \cdot X_s \quad (2)$$

$$\sqrt{X_{e1}^2 + Y_{e1}^2} = \sqrt{X_{e2}^2 + Y_{e2}^2}. \quad (3)$$

Consequently, it is possible to reliably and easily calculate the second movement end point position in the synthetic movement direction that maximizes the synthetic velocity.

The first aspect of the present invention is the numerical controller, and two solutions are obtained according to the simultaneous equations and the end point position calculating unit may be configured to use one of the solutions of a closer distance to the first movement end point position as the second movement end point position. Consequently, it is possible to calculate the end point position toward which the tool is about to move.

The first aspect of the present invention is the numerical controller, and the rotation angle calculating unit may be configured to calculate the rotation angle by calculating a first inclination angle, a second inclination angle, and a difference between the first inclination angle and the second inclination angle, wherein the first inclination angle is a line segment that connects the rotation center position and the first movement end point position and the second inclination angle is a line segment that connects the rotation center position and the second movement end point position. Consequently, even when the tool is moved to the second movement end point position along the synthetic movement direction that maximizes the synthetic velocity, it is possible to keep a relative positional relationship between the tool and a work (table).

The first aspect of the present invention is the numerical controller and may include: a first movement control unit configured to control movement of the tool along one axis direction of the two axis directions; and a second movement control unit configured to control the movement of the tool along another axis direction, and the first movement control unit and the second movement control unit may be configured to control the movement of the tool to linearly move the tool to the second movement end point position. Consequently, it is possible to axially feed the tool in a short time.

A second aspect of the present invention is a movement control method for a tool, wherein a numerical controller moves the tool based on a program, the tool is configured to machine a work supported on a table and is movable along at least two axis directions orthogonal to each other, and the movement control method includes: a program analyzing step of analyzing the program to obtain a first movement end point position of the tool that is linearly moved; a direction calculating step of calculating a synthetic movement direction that maximizes a synthetic velocity, based on a predetermined upper limit movement velocity of the tool in each of the at least two axis directions; an end point position calculating step of calculating an intersection position of a circle and the synthetic movement direction as a second movement end point position, wherein the circle has as a radius a distance from a rotation center position of the table to the first movement end point position; a rotation angle calculating step of calculating a rotation angle of the table based on the first movement end point position and the second movement end point position; and a rotation controlling step of rotating the table about the rotation center position based on the rotation angle.

Thus, the synthetic velocity is used at maximum, so that it is possible to reduce an axial feeding time.

The second aspect of the present invention is the movement control method for the tool, and, in the direction calculating step, an inclination angle of the synthetic movement direction may be calculated; and in the end point position calculating step, the second movement end point position may be calculated based on a current position of the tool, the first movement end point position and the inclination angle of the synthetic movement direction. Consequently, it is possible to calculate the second movement end point position in the synthetic movement direction that maximizes the synthetic velocity, and move the tool along the synthetic movement direction that maximizes the synthetic velocity.

The second aspect of the present invention is the movement control method for the tool, and, in the direction calculating step, the inclination angle $\alpha$ of the synthetic movement direction may be calculated according to following equation (1) where Vx represents the upper limit movement velocity in one axis direction of the two axis directions and Vy represents the upper limit movement velocity in another axis direction; and, in the end point position calculating step, the second movement end point position may be calculated according to simultaneous equations based on following equations (2), (3) where the known current position of the tool is $(X_s, Y_s)$, the first movement end point position is $(X_{e1}, Y_{e1})$ and the second movement end point position is $(X_{e2}, Y_{e2})$, $$\alpha = \tan^{-1}\frac{Vy}{Vx} \quad (1)$$

$$Y_{e2} = \alpha \cdot X_{e2} + Y_s - \alpha \cdot X_s \quad (2)$$

$$\sqrt{X_{e1}^2 + Y_{e1}^2} = \sqrt{X_{e2}^2 + Y_{e2}^2}. \quad (3)$$

Consequently, it is possible to reliably and easily calculate the second movement end point position in the synthetic movement direction that maximizes the synthetic velocity.

The second aspect of the present invention is the movement control method for the tool, and, in the end point position calculating step, two solutions are obtained according to the simultaneous equations, and one of the solutions of a closer distance to the first movement end point position may be used as the second movement end point position. Consequently, it is possible to calculate the end point position toward which the tool is about to move.

The second aspect of the present invention is the movement control method for the tool, and, in the rotation angle calculating step, the rotation angle may be calculated by calculating a first inclination angle and a second inclination angle and calculating a difference between the first inclination angle and the second inclination angle, wherein the first inclination angle is a line segment that connects the rotation center position and the first movement end point position and the second inclination angle is a line segment that connects the rotation center position and the second movement end point position. Consequently, even when the tool is moved to the second movement end point position along the synthetic movement direction that maximizes the synthetic velocity, it is possible to keep the relative positional relationship between the tool and the work (table). Consequently, it is possible to axially feed the tool in a short time.

The second aspect of the present invention is the movement control method for the tool, and may further include a movement controlling step of controlling the movement of the tool to linearly move the tool to the second movement end point position.

According to the present invention, the synthetic velocity is used at maximum, so that it is possible to reduce an axial feeding time.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a flowchart showing an operation of the numerical controller.

DESCRIPTION OF THE PREFERRED EMBODIMENTS

A preferred embodiment of a numerical controller and a movement control method for a tool according to the present invention will be described in detail below with reference to the accompanying drawings.

The numerical controller according to the present embodiment moves a tool that machines a work supported on a table, based on a program. This tool is movable along three axis directions orthogonal to each other. These three axis directions are an X axis direction, a Y axis direction and a Z axis direction. In this regard, the present embodiment describes an example where the tool is moved on an XY plane for convenience of explanation.

A drawback of conventional axial feeding will be described first. Then, an outline of axial feeding according to the present embodiment will be described. Subsequently, the numerical controller according to the present embodiment will be described in detail.

<Drawback of Conventional Axial Feeding and Outline of Axial Feeding According to Present Embodiment>

Figure 1A:
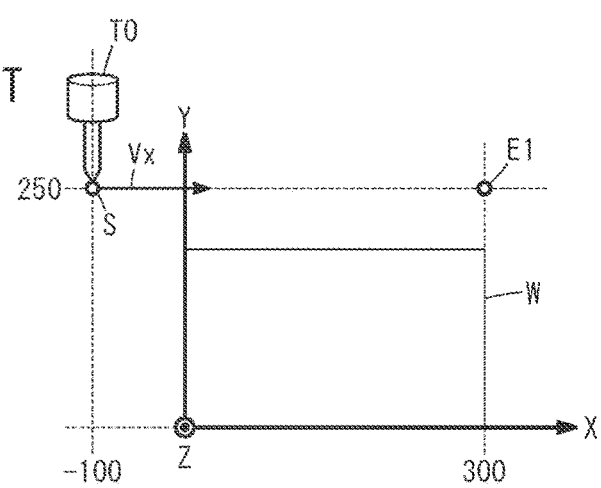
FIG. 1A is a view for explaining a drawback of conventional axial feeding.

As shown in FIG. 1A, a tool TO located at a start point position S (coordinates (x, y)=(−100, 250)) is linearly moved to an end point position E1 (coordinates (x, y)=300, 250)) along a +X axis direction. In this case, it is not possible to move the tool TO at a feedrate higher than an upper limit movement velocity Vx of the tool TO in the X axis direction, or reduce the feeding time any more.

In this regard, the tool TO is movable in the Y axis direction, too. Consequently, by moving the tool TO at an upper limit movement velocity Vy in the Y axis direction while moving the tool TO at the upper limit movement velocity Vx in the X axis direction, it is possible to move the tool TO at the feedrate higher than the upper limit movement velocity Vx. A synthetic velocity for moving the tool TO at these upper limit movement velocities Vx, Vy will be referred to as a maximum synthetic velocity Vc. A linear direction in which the tool TO moves at the maximum synthetic velocity Vc will be referred to as a synthetic movement direction A (see FIG. 1B).

When the tool TO is moved along the synthetic movement direction A, the tool TO cannot naturally reach the end point position E1. However, this end point position E1 is determined according to a relative positional relationship with the table (work W). Therefore, by rotating the table (work W) about a rotation center position (the Z axis in FIGS. 1A and 1B) on the XY plane, it is possible to keep the relative positional relationship between the tool TO and the table (work W).

Figure 1B:
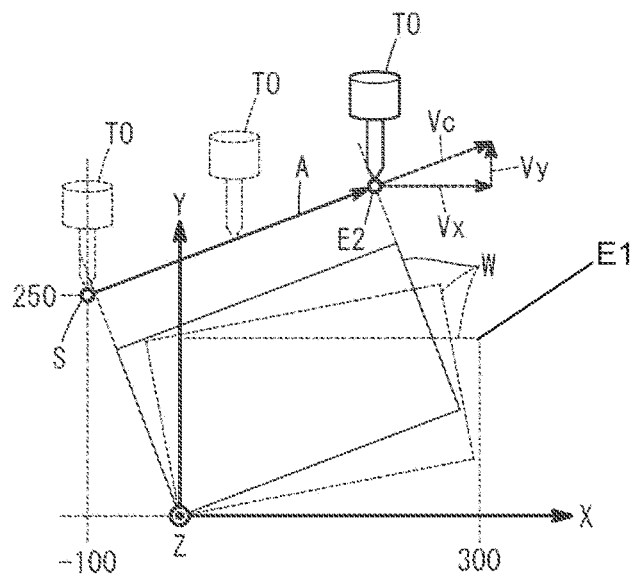
FIG. 1B is a view for explaining an outline of axial feeding according to the present embodiment.

That is, as shown in FIG. 1B, the end point position E1 and the table (work W) are rotated at a predetermined angle about the rotation center position (Z axis) of the table, to locate the end point position E1 in the synthetic movement direction A. Thus, the relative positional relationship between the tool TO and the table (work W) in a case where the tool TO is moved from the start point position S to the end point position E1 in the +X axis direction, matches with a relative positional relationship between the tool TO and the table (work W) in a case where the tool TO is moved from the start point position S to an end point position E2 (a position corresponding to the end point position E1) along the synthetic movement direction A. In this regard, the end point position E2 is a position that is in the synthetic movement direction A in a case where the end point position E1 is rotated about the rotation center position of the table to locate the end point position E1 in the synthetic movement direction A.

Thus, by rotating the end point position E1 and the table (work W) at a predetermined angle, it is possible to substantially reduce the feeding time of the tool TO.

FIGS. 1A and 1B show examples where the tool TO is linearly moved in a single axis direction (X axis direction). However, the present invention is also applicable to a case of moving the tool TO in multiple axis directions (the X axis direction and the Y axis direction) to linearly move the tool TO as a result. That is, even when the tool TO is moved in the X axis direction and the Y axis direction, the synthetic velocity does not necessarily match with the maximum synthetic velocity Vc.

<Explanation of Numerical Controller 10 According to Present Embodiment>

Figure 2:
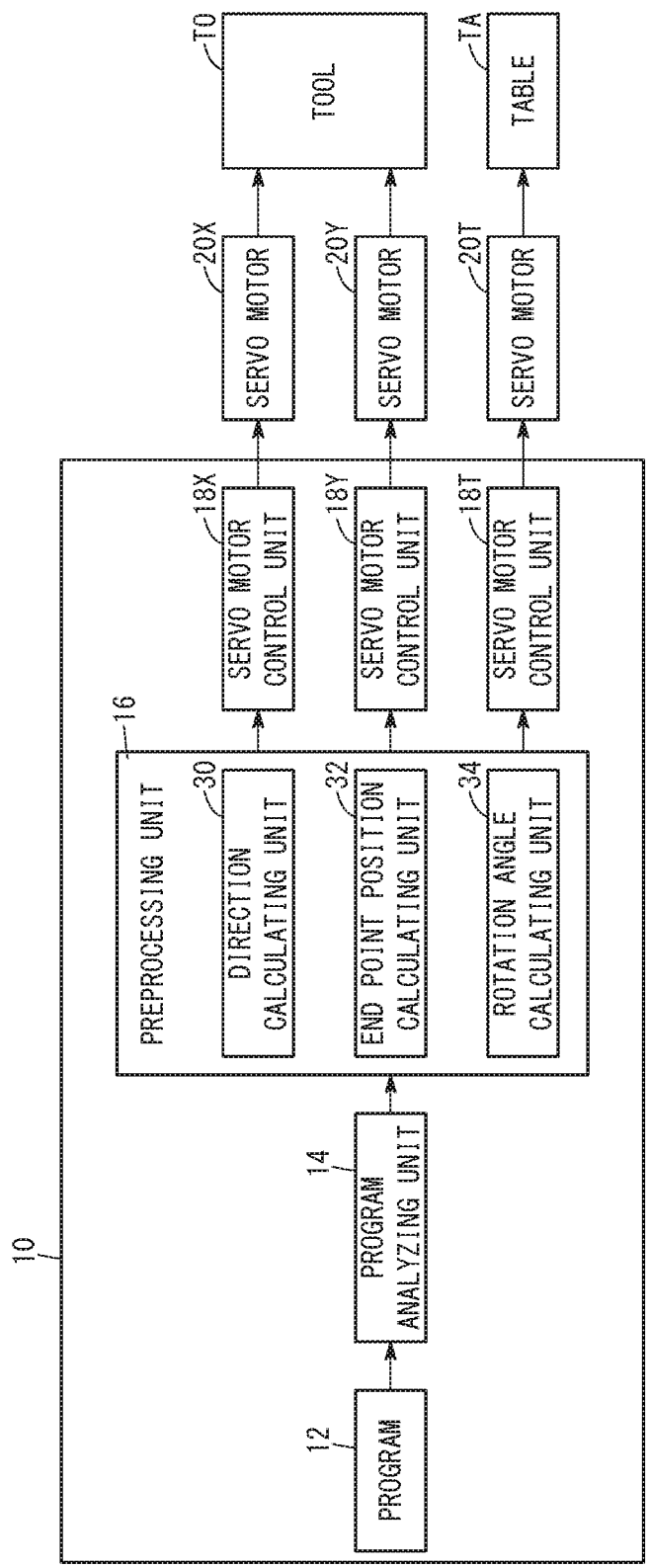
FIG. 2 is a configuration diagram of a numerical controller according to the present embodiment.

FIG. 2 is a configuration diagram of a numerical controller 10 according to the present embodiment. The elements in FIG. 2 and subsequent drawings, which are similar to the elements having reference numerals in FIGS. 1A and 1B, will be described using the same reference numerals. Although not shown, the numerical controller 10 includes a processor such as a CPU and a storage medium in which basic programs are stored. The processor executes the basic programs to function as the numerical controller 10 according to the present embodiment. Although not shown, the numerical controller 10 includes as well an input unit that an operator can operate to input information and a command, a display unit that displays the information, and the like.

The numerical controller 10 includes a program 12, a program analyzing unit 14, a preprocessing unit 16 and servo motor control units 18X, 18Y, 18T. A servo motor 20X is a motor that moves the tool TO in the X axis direction, and a servo motor 20Y is a motor that moves the tool TO in a Y axis direction. A servo motor 20T is a servo motor that rotates a table TA that supports the work W about a rotation center position O of the table TA on the XY plane. The X axis direction, the Y axis direction and the Z axis direction are orthogonal to each other.

The numerical controller 10 includes a preset XYZ coordinate system, and recognizes a position of the tool TO and a position of the table TA based on this XYZ coordinate system. The XYZ coordinate system expresses an actual position of a machine (the tool TO or the table TA) on a coordinate system. Hence, the X axis direction and the Y axis direction of the XYZ coordinate system match with the X axis direction and the Y axis direction in which the tool TO actually moves. The Z axis direction of the XYZ coordinate system passes on the rotation center position O of the table TA. Thus, a position of an origin on the XY plane of the XYZ coordinate system is the rotation center position O.

The program 12 is stored in the storage medium of the numerical controller 10, and in which a program is described for axially feeding at least the tool TO. The program analyzing unit 14 analyzes the program 12 to obtain the end point position E1 (first movement end point position) of the tool TO as a command value. This end point position E1 is a position based on the XYZ coordinate system. The end point position E1 obtained by the program analyzing unit 14 is outputted to the preprocessing unit 16.

A coordinate position of the end point position E1 is expressed as ($X_{e1}$, $Y_{e1}$). A coordinate position of the start point position (the current position of the tool TO) S is expressed as ($X_s$, $Y_s$). This start point position S ($X_s$, $Y_s$) is known. The position $X_{e1}$ and the position $X_s$ are the positions on the X axis of the XYZ coordinate system, and the position $Y_{e1}$ and the position $Y_s$ are the positions on the Y axis of the XYZ coordinate system.

The preprocessing unit 16 calculates the synthetic movement direction A that maximizes the synthetic velocity based on the upper limit movement velocity Vx in the X axis direction and the upper limit movement velocity Vy in the Y axis direction. The preprocessing unit 16 calculates the end point position E2 (second movement end point position) of the tool TO and a rotation angle θ of the table TA that keep the relative positional relationship between the tool TO after the linear movement and the table TA even when the tool TO is linearly moved from the start point position S ($X_s$, $Y_s$) along the synthetic movement direction A.

As described above, the rotation angle θ is an angle at which the end point position E1 ($X_{e1}$, $Y_{e1}$) and the table TA are rotated about the rotation center position O (i.e., about the Z axis), to move the end point position E1 ($X_{e1}$, $Y_{e1}$) so as to be positioned in the synthetic movement direction A.

The end point position E2 of the tool TO is the position in the synthetic movement direction A in a case where the end point position E1 of the tool TO is rotated about the rotation center position O of the table (about the Z axis). A coordinate position of this end point position E2 is expressed as ($X_{e2}$, $Y_{e2}$). The position $X_{e2}$ is a position on the X axis of the XYZ coordinate system, and the position $Y_{e2}$ is a position on the Y axis of the XYZ coordinate system. The preprocessing unit 16 will be described in detail below.

The preprocessing unit 16 outputs the position $X_{e2}$ on the X axis of the end point position E2 ($X_{e2}$, $Y_{e2}$) to the servo motor control unit (first movement control unit) 18X and the position $Y_{e2}$ on the Y axis to the servo motor control unit (second movement control unit) 18Y. The preprocessing unit 16 outputs the calculated rotation angle θ to the servo motor control unit (rotation control unit) 18T.

The servo motor control unit 18X controls the servo motor 20X to move the tool TO from the position $X_s$ to the position $X_{e2}$ at the upper limit movement velocity Vx. The servo motor control unit 18Y controls the servo motor 20Y to move the tool TO from the position $Y_s$ to the position $Y_{e2}$ at the upper limit movement velocity Vy. Thus, the tool TO linearly moves from the start point position S ($X_s$, $Y_s$) to the end point position E2 ($X_{e2}$, $Y_{e2}$) along the synthetic movement direction A at the maximum synthetic velocity Vc. The servo motor control unit 18T controls the servo motor 20T to rotate the table TA about the rotation center position O (about the Z axis).

Next, the preprocessing unit 16 will be described in detail with reference to FIG. 3, too. The preprocessing unit 16 includes a direction calculating unit 30, an end point position calculating unit 32 and a rotation angle calculating unit 34. The direction calculating unit 30 calculates the synthetic movement direction A that maximizes the synthetic velocity, based on the predetermined upper limit movement velocities (vectors) Vx, Vy of the tool TO in the X axis direction and the Y axis direction, respectively.

Figure 3:
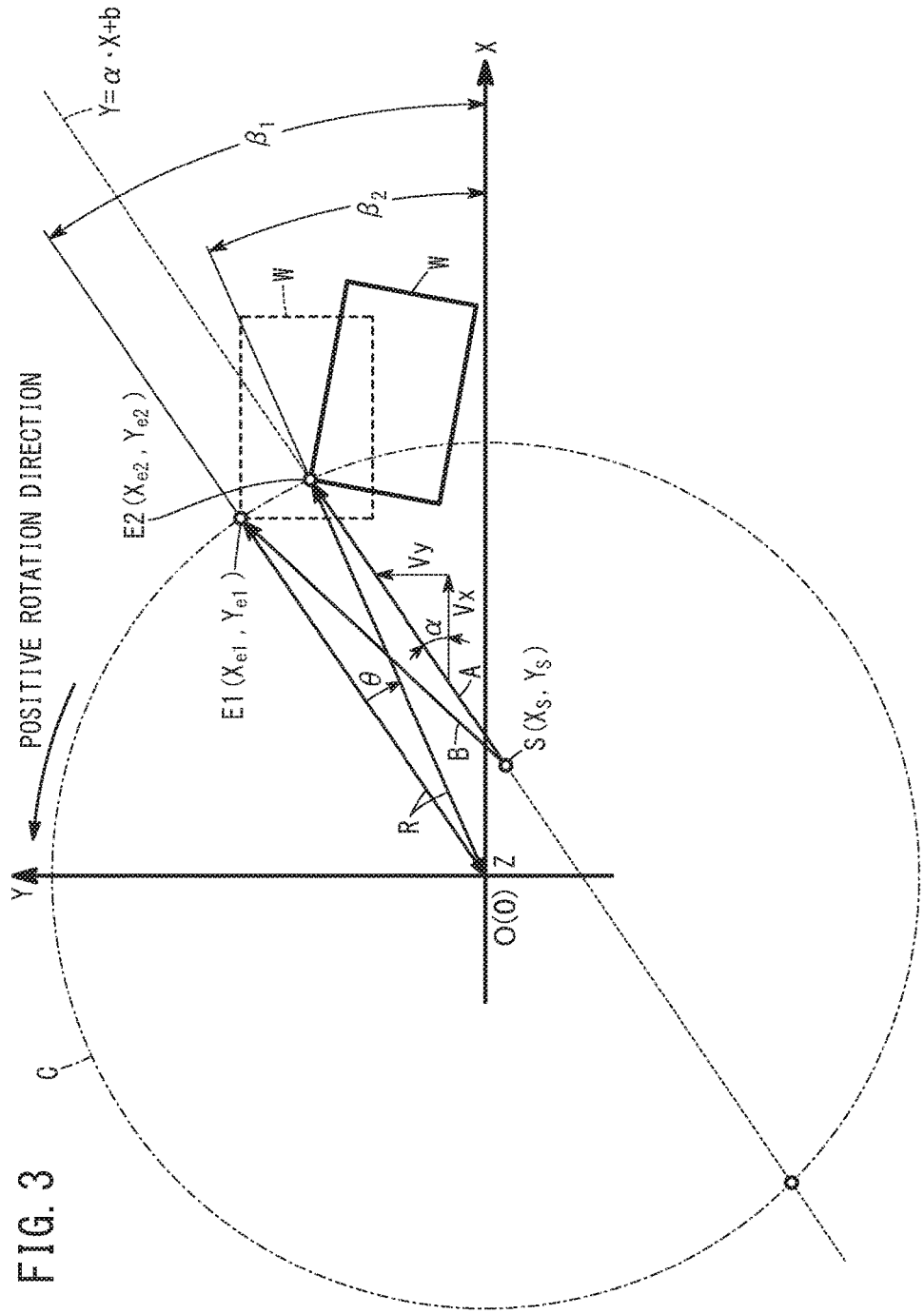
FIG. 3 is a view for explaining a configuration of each unit of a preprocessing unit shown in FIG. 2.

As shown in FIG. 3, a direction in which a synthetic vector obtained by adding the upper limit movement velocity (vector) Vx and the upper limit movement velocity (vector) Vy extends is the synthetic movement direction A. The direction calculating unit 30 calculates an inclination angle α of the synthetic movement direction A (an inclination angle with respect to a direction parallel to the X axis direction). The direction calculating unit 30 calculates the inclination angle α based on following equation (4).

$$\alpha = \tan^{-1} \frac{Vy}{Vx} \tag{4}$$

The upper limit movement velocities Vx, Vy may be maximum movement velocities at which the servo motors 20X, 20Y can move the tool TO or movement velocities determined in advance by an operator.

The end point position calculating unit 32 calculates the end point position E2 ($X_{e2}$, $Y_{e2}$) corresponding to the end point position E1 ($X_{e1}$, $Y_{e1}$) to which the tool TO is moved along the synthetic movement direction A. The end point position calculating unit 32 calculates as the end point position E2 ($X_{e2}$, $Y_{e2}$) an intersection position of a circle C having as a radius R a distance from the rotation center position O of the table TA to the end point position E1 ($X_{e1}$, $Y_{e1}$), and the synthetic movement direction A.

Calculation of the end point position E2 ($X_{e2}$, $Y_{e2}$) in the end point position calculating unit 32 will be specifically described below. In the XY coordinate system, the position (X, Y) of the tool TO that moves along the synthetic movement direction A can be expressed by following equation (5). This equation (5) is a function that indicates the synthetic movement direction A. The term b represents a predetermined constant. When the present invention is not applied, the tool TO moves from the start point position S ($X_s$, $Y_s$) to the end point position E1 ($X_{e1}$, $Y_{e1}$) along a movement direction B.

$$Y = \alpha \cdot X + b \tag{5}$$

The tool TO that moves along the synthetic movement direction A passes on the start point position S ($X_s$, $Y_s$) of the tool TO on the XY coordinate system. Therefore, by substituting the start point position S ($X_s$, $Y_s$) in equation (5), it is possible to obtain following equation (6). In this regard, the start point position S ($X_s$, $Y_s$) is known.

$$b = Y_s - \alpha \cdot X_s \tag{6}$$

Following equation (7) can be derived from equation (5) and equation (6).

$$Y = \alpha \cdot X + Y_s - \alpha \cdot X_s \tag{7}$$

The tool TO that moves along the synthetic movement direction A passes the end point position E2 ($X_{e2}$, $Y_{e2}$). Therefore, by substituting the end point position E2 ($X_{e2}$, $Y_{e2}$) in equation (7), it is possible to obtain following equation (8).

$$Y_{e2} = \alpha \cdot X_{e2} + Y_s - \alpha \cdot X_s \tag{8}$$

The radius R of the circle C can be expressed by following equation (9) by using the end point position E1 ($X_{e1}$, $Y_{e1}$).

$$R = \sqrt{X_{e1}^2 + Y_{e1}^2} \tag{9}$$

The end point position E2 ($X_{e2}$, $Y_{e2}$) is the intersection position of the circle C having as the radius R the distance from the rotation center position O (the origin on the XY plane) of the table TA to the end point position E1 ($X_{e1}$, $Y_{e1}$), and the synthetic movement direction A. Therefore, the end point position E1 ($X_{e1}$, $Y_{e1}$) and the end point position E2 ($X_{e2}$, $Y_{e2}$) have a relationship of following equation (10).

$$\sqrt{X_{e1}^2 + Y_{e1}^2} = \sqrt{X_{e2}^2 + Y_{e2}^2} \tag{10}$$

By solving simultaneous equations of equation (8) and equation (10), it is possible to calculate the end point position E2 ($X_{e2}$, $Y_{e2}$). Consequently, the end point position calculating unit 32 can calculate the end point position E2 ($X_{e2}$, $Y_{e2}$) based on the end point position E1 ($X_{e1}$, $Y_{e1}$) obtained by the program analyzing unit 14, the inclination angle α calculated by the direction calculating unit 30 and the known start point position S ($X_s$, $Y_s$) and by using equation (8) and equation (10).

By solving the simultaneous equations of equation (8) and equation (10), two intersections of the synthetic movement direction A and the circle C are obtained as shown in FIG. 3. These two solutions (intersection positions) are a solution 1 ($X_{A1}$, $Y_{A1}$) and a solution 2 ($X_{A2}$, $Y_{A2}$). The end point position calculating unit 32 uses the solution at a position closest to the end point position E1 ($X_{e1}$, $Y_{e1}$) as the end point position E2 ($X_{e2}$, $Y_{e2}$).

More specifically, the end point position calculating unit 32 calculates a distance $S_1$ between the end point position E1 ($X_{e1}$, $Y_{e1}$) and the solution 1 ($X_{A1}$, $Y_{A1}$) according to following equation (11). Also, the end point position calculating unit 32 calculates a distance $S_2$ between the end point position E1 ($X_{e1}$, $Y_{e1}$) and the solution 2 ($X_{A2}$, $Y_{A2}$) according to following equation (12). Further, the end point position calculating unit 32 compares the distance $S_1$ and the distance $S_2$ and determines the solution of a shorter distance as the end point position E2 ($X_{e2}$, $Y_{e2}$).

$$S_1 = \sqrt{(X_{A1} - X_{e1})^2 + (Y_{A1} - Y_{e1})^2} \tag{11}$$

$$S_2 = \sqrt{(X_{A2} - X_{e1})^2 + (Y_{A2} - Y_{e1})^2} \tag{12}$$

The rotation angle calculating unit 34 calculates the rotation angle $\theta$ of the table TA (work W) based on the end point position E1 ($X_{e1}$, $Y_{e1}$) and the end point position E2 ($X_{e2}$, $Y_{e2}$). First, the rotation angle calculating unit 34 calculates an inclination angle (first inclination angle) $\beta_1$ of a line segment that connects the rotation center position O of the table TA and the end point position E1 ($X_{e1}$, $Y_{e1}$) and an inclination angle (second inclination angle) $\beta_2$ of a line segment that connects the rotation center position O of the table TA and the end point position E2 ($X_{e2}$, $Y_{e2}$). The rotation angle calculating unit 34 calculates the inclination angles $\beta_1$, $\beta_2$ by using following equations (13), (14). In this regard, the inclination angles $\beta_1$, $\beta_2$ are inclination angles with respect to a direction parallel to the X axis direction.

$$\beta_1 = \tan^{-1} \frac{Y_{e1}}{X_{e1}} \tag{13}$$

$$\beta_2 = \tan^{-1} \frac{Y_{e2}}{X_{e2}} \tag{14}$$

The rotation angle calculating unit 34 calculates the rotation angle $\theta$ by calculating a difference between the inclination angles $\beta_1$ and the inclination angle $\beta_2$. As shown in FIG. 3, when a leftwise direction (counterclockwise direction) about the rotation center position O is a positive direction, the rotation angle calculating unit 34 calculates the rotation angle $\theta$ by subtracting the inclination angles $\beta_1$ from the inclination angle $\beta_2$. In this case, the rotation angle $\theta$ has a relationship of $\theta = \beta_2 - \beta_1$. By contrast with this, when a rightwise direction (clockwise direction) about the rotation center position O is the positive direction, the rotation angle calculating unit 34 calculates the rotation angle $\theta$ by subtracting the inclination angles $\beta_2$ from the inclination angle $\beta_1$. In this case, the rotation angle $\theta$ has a relationship of $\theta = \beta_1 - \beta_2$.

Next, an operation of the numerical controller 10 will be described with reference to a flowchart shown in FIG. 4. In step S1, the program analyzing unit 14 analyzes the program 12 to obtain the end point position E1 ($X_{e1}$, $Y_{e1}$) of the tool TO.

Next, in step S2, the program analyzing unit 14 analyzes the program 12 to determine whether or not this movement is linear movement. When it is determined in step S2 that the movement is not the linear movement, this operation is finished. When it is determined in step S2 that the movement is the linear movement, the flow moves to step S3.

When the flow moves to step S3, the direction calculating unit 30 calculates the inclination angle $\alpha$ of the synthetic movement direction A that maximizes the synthetic velocity. The direction calculating unit 30 calculates the inclination angle $\alpha$ based on the upper limit movement velocity Vx in the X axis direction and the upper limit movement velocity Vy in the Y axis direction by using equation (4). These upper limit movement velocities Vx, Vy are predetermined velocities.

Next, in step S4, the end point position calculating unit 32 calculates the end point position E2 ($X_{e2}$, $Y_{e2}$) based on the start point position S ($X_s$, $Y_s$) of the tool TO, the end point position E1 ($X_{e1}$, $Y_{e1}$) obtained in step S1, and the inclination angle $\alpha$ calculated in step S3 by using the simultaneous equations of equation (8) and equation (10). In this case, the simultaneous equations provide the two solutions, i.e., the solution 1 ($X_{A1}$, $Y_{A1}$) and the solution 2 ($X_{A2}$, $Y_{A2}$). Therefore, the end point position calculating unit 32 uses the solution of the shortest distance to the end point position E1 ($X_{e1}$, $Y_{e1}$) as the end point position E2 ($X_{e2}$, $Y_{e2}$) by using equation (11), equation (12) and the end point position E1 ($X_{e1}$, $Y_{e1}$).

Next, in step S5, the rotation angle calculating unit 34 calculates the inclination angle $\beta_1$ of the line segment that connects the rotation center position O and the end point position E1 ($X_{e1}$, $Y_{s1}$). The rotation angle calculating unit 34 calculates the inclination angle $\beta_1$ based on the end point position E1 ($X_{e1}$, $Y_{e1}$) by using equation (13).

Next, in step S6, the rotation angle calculating unit 34 calculates the inclination angle $\beta_2$ of the line segment that connects the rotation center position O and the end point position E2 ($X_{e2}$, $Y_{e2}$). The rotation angle calculating unit 34 calculates the inclination angle $\beta_2$ based on the end point position E2 ($X_{e2}$, $Y_{e2}$) by using equation (14).

Next, in step S7, the rotation angle calculating unit 34 calculates the inclination angle $\theta$ based on the inclination angle $\beta_1$ calculated in step S5 and the inclination angle $\beta_2$ calculated in step S6. The rotation angle calculating unit 34 calculates the rotation angle $\theta$ by calculating the difference between the inclination angle $\beta_1$ and the inclination angle 132.

Next, in step S8, the servo motor control units 18X, 18Y control the servo motors 20X, 20Y to move the tool TO at the maximum synthetic velocity Vc along the synthetic movement direction A. At the same time as this movement, the servo motor control unit 18T controls the servo motor 20T to rotate the table TA at the rotation angle $\theta$ calculated in step S7 about the rotation center position O (about the Z axis). Consequently, it is possible to rotate the table TA at the rotation angle $\theta$ while linearly moving the tool TO to the end point position E2 ($X_{e2}$, $Y_{e2}$) at the maximum synthetic velocity Vc. Consequently, it is possible to reduce an axial feeding time of the tool.

The above embodiment has described rotating the table TA on the two-dimensional XY plane of the X axis and the Y axis for ease of description. However, the table TA may be three-dimensionally rotated based on the same principal. That is, the table TA may be rotated on the XY plane, a XZ plane and a YZ plane.

In this case, the synthetic movement direction A that maximizes the synthetic velocity is calculated based on the upper limit movement velocity Vx in the X axis direction, the upper limit movement velocity Vy in the Y axis direction, and an upper limit movement velocity Vz in the Z axis direction. The inclination angle $\alpha$ (referred to as $\alpha$xy below) of the synthetic movement direction A on the XY plane is calculated based on the upper limit movement velocities Vx, Vy as described above. The inclination angle $\alpha$ (referred to as $\alpha$xz below) of the synthetic movement direction A on the XZ plane is calculated based on the upper limit movement velocities Vx, Vz. The inclination angle $\alpha$ (referred to as $\alpha$yz below) of the synthetic movement direction A on the YZ plane is calculated based on the upper limit movement velocities Vy, Vz.

The intersection position of the circle (ball) C having as the radius R a distance from the rotation center position O of the table TA to the end point position E1 ($X_{e1}$, $Y_{e1}$, $Z_{e1}$), and the synthetic movement direction A is calculated as the end point position E2 ($X_{e2}$, $Y_{e2}$, $Z_{e2}$). The rotation angles θ (θxy, θxz, θyz) of the table TA on respective planes (the XY plane, the XZ plane and the YZ plane) are calculated based on the end point position E1 ($X_{e1}$, $Y_{e1}$, $Z_{e1}$) and the end point position E2 ($X_{e2}$, $Y_{e2}$, $Z_{e2}$).

The numerical controller 10 according to the above embodiment moves the tool TO that machines the work W supported on the table TA and that is movable along at least the two axis directions orthogonal to each other, based on the program 12. The numerical controller 10 includes the program analyzing unit 14 that analyzes the program 12 to obtain the end point position E1 of the tool TO that is linearly moved, the direction calculating unit 30 that calculates the synthetic movement direction A that maximizes the synthetic velocity based on the predetermined upper limit movement velocity of the tool TO in each of at least the two axis directions, the end point position calculating unit 32 that calculates as the end point position E2 the intersection position of the circle C having as the radius R the distance from the rotation center position O of the table TA to the end point position E1, and the synthetic movement direction A, the rotation angle calculating unit 34 that calculates the rotation angle θ of the table TA based on the end point position E1 and the end point position E2, and the servo motor control unit 18T that controls rotation of the table TA about the rotation center position O based on the rotation angle θ. Thus, the synthetic velocity is used at maximum, so that it is possible to reduce an axial feeding time.

The direction calculating unit 30 may calculate the inclination angle α of the synthetic movement direction A. The end point position calculating unit 32 may calculate the end point position E2 based on the current position (start point position) S of the tool TO, the end point position E1 and the inclination angle α of the synthetic movement direction A. Consequently, it is possible to calculate the end point position E2 in the synthetic movement direction A that maximizes the synthetic velocity, and move the tool TO along the synthetic movement direction A that maximizes the synthetic velocity.

The direction calculating unit 30 calculates the inclination angle α of the synthetic movement direction A according to above equation (4) in a case where Vx represents the upper movement velocity in one axis direction of the two axis directions and Vy represents the upper limit movement velocity in the other axis direction. The end point position calculating unit 32 may calculate the end point position E2 according to the simultaneous equations of above equations (8) and (10) in a case where the known current position of the tool TO is ($X_s$, $Y_s$), the end point position E1 is ($X_{e1}$, $Y_{e1}$) and the end point position E2 is ($X_{e2}$, $Y_{e2}$). Consequently, it is possible to reliably and easily calculate the end point position E2 in the synthetic movement direction A that maximizes the synthetic velocity.

The end point position calculating unit 32 uses the solution of the closer distance to the end point position E1 among the two solutions obtained by the simultaneous equations as the end point position E2. Consequently, it is possible to calculate the end point position E2 toward which the tool TO is about to move.

The rotation angle calculating unit 34 calculates the rotation angle θ by calculating the inclination angle $β_1$ of the line segment that connects the rotation center position O and the end point position E1 and the inclination angle $β_2$ of the line segment that connects the rotation center position O and the end point position E2, and calculating the difference between the inclination angle $β_1$ and the inclination angle $β_2$. Consequently, even when the tool TO is moved to the end point position E2 along the synthetic movement direction A that maximizes the synthetic velocity, it is possible to keep the relative positional relationship between the tool TO and the work W (table TA).

The numerical controller 10 includes the servo motor control unit 18X that controls the movement of the tool TO along the one axis direction of the two axis directions, and the servo motor control unit 18Y that controls the movement of the tool TO along the other axis direction. The servo motor control unit 18X and the servo motor control unit 18Y control the movement of the tool TO to linearly move the tool TO to the end point position E2. Consequently, it is possible to axially feed the tool TO in a short time.

While the invention has been particularly shown and described with reference to embodiments, it will be understood that variations and modifications can be effected thereto without departing from the scope of the invention as defined by the appended claims.

What is claimed is:

1. A numerical controller that moves a tool based on a program stored in a storage medium of the numerical controller, the tool being configured to machine a work supported on a table having a rotation center position and being movable along at least two axis directions orthogonal to each other, the numerical controller comprising:
   a program analyzing processor configured to obtain, from the program, a first movement end point position of the tool that is linearly moved;
   a direction calculating processor configured to calculate a synthetic movement direction that maximizes a synthetic velocity of the tool, based on a predetermined upper limit movement velocity of the tool in each of the at least two axis directions;
   an end point position calculating processor configured to calculate an intersection position of a circle and the synthetic movement direction as a second movement end point position, the circle having as a radius a distance from a rotation center position of the table to the first movement end point position;
   a rotation angle calculating processor configured to calculate a rotation angle of the table based on the first movement end point position and the second movement end point position; and
   a rotation control processor configured to control rotation of the table about the rotation center position based on the rotation angle so that the tool is able to perform a cutting feed at a maximum movement velocity of the tool, wherein the maximum movement velocity is based on a predetermined upper limit movement velocity of the tool in each of the at least two axis directions.

2. The numerical controller according to claim 1, wherein:
   the direction calculating processor is configured to calculate an inclination angle of the synthetic movement direction; and
   the end point position calculating processor is configured to calculate the second movement end point position based on a current position of the tool, the first movement end point position and the inclination angle of the synthetic movement direction.

3. The numerical controller according to claim 2, wherein:
   the direction calculating processor is configured to calculate the inclination angle α of the synthetic movement direction according to following equation (1) where Vx represents the upper limit movement velocity in one axis direction of the two axis directions and Vy represents the upper limit movement velocity in another axis direction; and the end point position calculating processor is configured to calculate the second movement end point position according to simultaneous equations based on following equations (2), (3) where the known current position of the tool is $(X_s, Y_s)$, the first movement end point position is $(X_{e1}, Y_{e1})$ and the second movement end point position is $(X_{e2}, Y_{e2})$, $$\alpha = \tan^{-1} \frac{Vy}{Vx} \qquad (1)$$

$$Y_{e2} = \alpha \cdot X_{e2} + Y_s - \alpha \cdot X_s \qquad (2)$$

$$\sqrt{X_{e1}^2 + Y_{e1}^2} = \sqrt{X_{e2}^2 + Y_{e2}^2}. \qquad (3)$$

4. The numerical controller according to claim 3, wherein two solutions are obtained according to the simultaneous equations, and the end point position calculating processor is configured to use one of the solutions of a closer distance to the first movement end point position as the second movement end point position.

5. The numerical controller according to claim 1, wherein of the at least two axis directions, one axis direction is taken as a reference axis direction, the rotation angle calculating processor is configured to calculate the rotation angle by calculating a first inclination angle, a second inclination angle, and a difference between the first inclination angle and the second inclination angle, the first inclination angle being an angle that a line segment that connects the rotation center position and the first movement end point position makes with respect to the reference axis direction, and the second inclination angle being an angle that a line segment that connects the rotation center position and the second movement end point position makes with respect to the reference axis direction.

6. The numerical controller according to claim 1, further comprising:
a first movement control processor configured to control movement of the tool along one axis direction of the two axis directions; and
a second movement control processor configured to control the movement of the tool along another axis direction,
wherein the first movement control processor and the second movement control processor are configured to control the movement of the tool to linearly move the tool to the second movement end point position.

7. A movement control method for a tool, wherein a numerical controller moves the tool based on a program stored on a storage medium of the numerical controller, the tool being configured to machine a work supported on a table having a rotation center position and being movable along at least two axis directions orthogonal to each other, the movement control method comprising:
a program analyzing step of obtaining, from the program, a first movement end point position of the tool that is linearly moved;
a direction calculating step of calculating a synthetic movement direction that maximizes a synthetic velocity, based on a predetermined upper limit movement velocity of the tool in each of the at least two axis directions;
an end point position calculating step of calculating an intersection position of a circle and the synthetic movement direction as a second movement end point position, the circle having as a radius a distance from a rotation center position of the table to the first movement end point position;
a rotation angle calculating step of calculating a rotation angle of the table based on the first movement end point position and the second movement end point position; and
a rotation controlling step of rotating the table about the rotation center position based on the rotation angle so that the tool is able to perform a cutting feed at a maximum movement velocity of the tool, wherein the maximum movement velocity is based on a predetermined upper limit movement velocity of the tool in each of the at least two axis directions.

8. The movement control method for the tool according to claim 7, wherein:
in the direction calculating step, an inclination angle of the synthetic movement direction is calculated; and
in the end point position calculating step, the second movement end point position is calculated based on a current position of the tool, the first movement end point position, and the inclination angle of the synthetic movement direction.

9. The movement control method for the tool according to claim 8, wherein:
in the direction calculating step, the inclination angle $\alpha$ of the synthetic movement direction is calculated according to following equation (1) where Vx represents the upper limit movement velocity in one axis direction of the two axis directions and Vy represents the upper limit movement velocity in another axis direction; and
in the end point position calculating step, the second movement end point position is calculated according to simultaneous equations based on following equations (2), (3) where the known current position of the tool is $(X_s, Y_s)$, the first movement end point position is $(X_{e1}, Y_{e1})$ and the second movement end point position is $(X_{e2}, Y_{e2})$, $$\alpha = \tan^{-1} \frac{Vy}{Vx} \qquad (1)$$

$$Y_{e2} = \alpha \cdot X_{e2} + Y_s - \alpha \cdot X_s \qquad (2)$$

$$\sqrt{X_{e1}^2 + Y_{e1}^2} = \sqrt{X_{e2}^2 + Y_{e2}^2}. \qquad (3)$$

10. The movement control method for the tool according to claim 9, wherein, in the end point position calculating step, two solutions are obtained according to the simultaneous equations, and one of the solutions of a closer distance to the first movement end point position is used as the second movement end point position.

11. The movement control method for the tool according to claim 7, wherein, of the at least two axis directions, one axis direction is taken as a reference axis direction, in the rotation angle calculating step, the rotation angle is calculated by calculating a first inclination angle and a second inclination angle and calculating a difference between the first inclination angle and the second inclination angle, the first inclination angle being an angle that a line segment that connects the rotation center position and the first movement end point position and the second inclination angle being an angle that a line segment that connects the rotation center position and the second movement end point position makes with respect to the reference axis direction.

12. The movement control method for the tool according to claim 7, further comprising a movement controlling step of controlling the movement of the tool to linearly move the tool to the second movement end point position.

\* \* \* \* \*